United States Patent

Harley

[15] 3,651,623
[45] Mar. 28, 1972

[54] APPARATUS FOR, AND METHOD OF MOWING STEEP EMBANKMENTS

[72] Inventor: Rutherford B. Harley, 4300 Bishop Lake Road, Marietta, Ga. 30060

[22] Filed: May 15, 1970

[21] Appl. No.: 37,537

[52] U.S. Cl..............................56/15.5, 56/10.5, 56/15.4, 56/DIG. 2
[51] Int. Cl. ......................................................A01d 35/28
[58] Field of Search..................56/7, 10.5, 15.5, DIG. 2, 154

[56] References Cited

UNITED STATES PATENTS

| | | | |
|---|---|---|---|
| 2,483,762 | 10/1949 | Ebenhoe | 56/7 |
| 2,941,346 | 6/1960 | Perry | 56/10.5 |
| 2,698,507 | 1/1955 | Siebring | 56/10.5 X |

Primary Examiner—Louis G. Mancene
Assistant Examiner—J. N. Eskovitz
Attorney—Newton, Hopkins & Ormsby

[57] ABSTRACT

Apparatus for and a method of mowing vegetation on steep embankments including a tractor-drawn trailer, suitably equipped for (1) transporting a power mower, (2) offloading the mower, and (3) controlling by cable means the substantially vertical ascent and descent of the mower while in operation. The trailer derives its power to control the vertical movement of the mower from a tractor. The power mower contains a radio-controlled steering mechanism for providing lateral movement during the substantially vertical cable-controlled mowing operation, which is responsive to electrical signals from a multiple-channel transmitter, normally mounted on the tractor, but capable of being detached and operated away from the tractor. The combined power mowing apparatus, comprising a tractor, the powered transporting and control trailer, and a radio-controlled power mower, are utilized in a simplified method of mowing vegetation on steep embankments, where conventional power operated mowing equipments are unable to traverse steep grades. The combined apparatus is capable of being operated on service plateaus either above or below embankments, and is usually controlled by a single tractor driving operator; however, in cases where embankments are out of sight of the tractor operator, the transmitter for controlling the lateral displacement of the power mower may be demounted from the tractor and employed by a second operator who is within view of the tractor operator.

2 Claims, 13 Drawing Figures

Patented March 28, 1972

INVENTOR
Rutherford B. Harley
By Newton, Hopkins & Ormsby

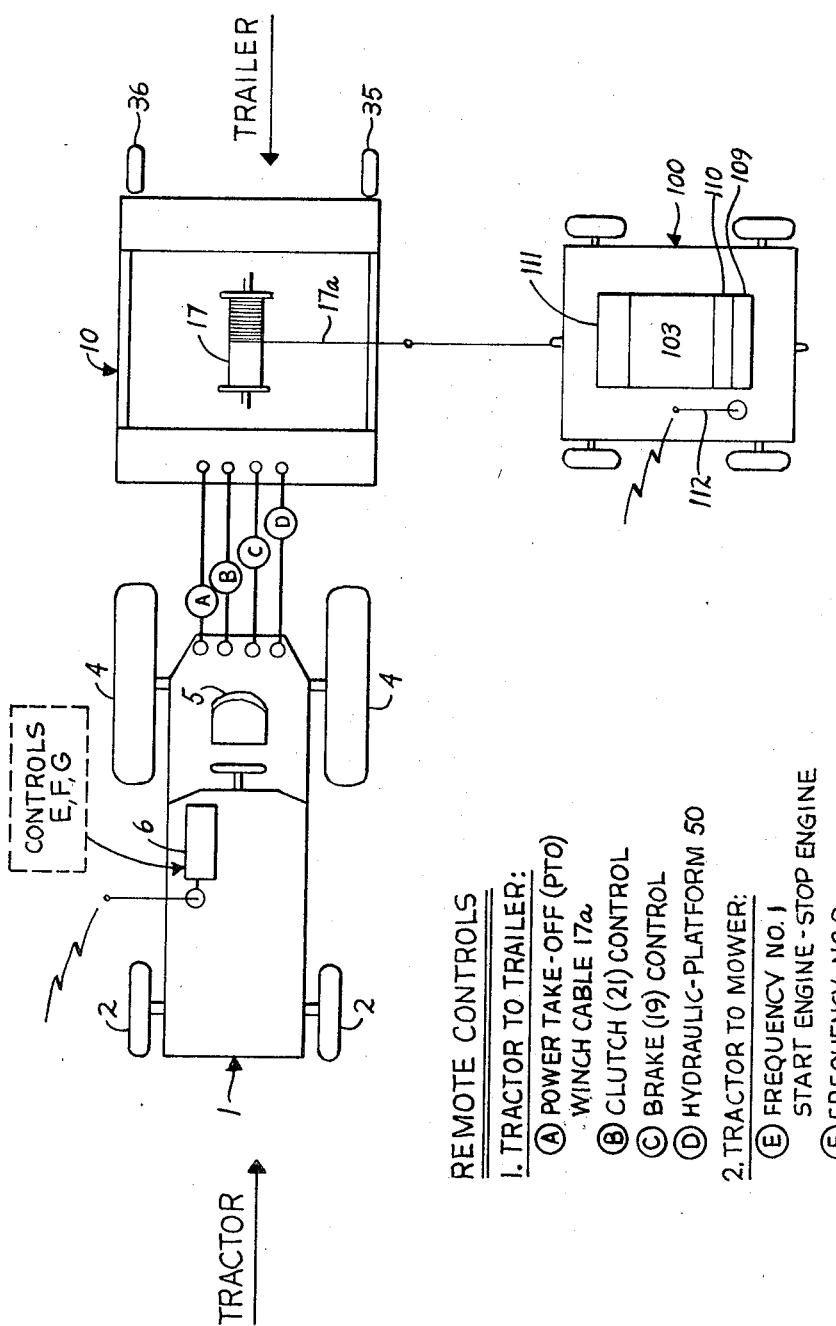

APPARATUS FOR, AND METHOD OF MOWING STEEP EMBANKMENTS

BACKGROUND OF THE INVENTION

This invention provides a solution for the long standing dilemma of highway maintenance personnel who are faced with the requirement to cut, mow or otherwise remove grass or other vegetation on very steep embankments. Although the embankments discussed herein are generally considered as being those located adjacent to roads and highways, they could be located elsewhere. Various types of powered mowing equipment have been employed previously, including tractor drawn as well as manually operated power mowing apparatus.

Quite often there have been limitations on the utilization of the above classes of mowing equipment, usually due to excessive grade slopes. Tractor drawn mowers generally are severely limited in their ability to negotiate steep slopes while mowing in a lateral direction, or parallel to the elongated axis of an embankment. Additionally, it would be extremely difficult or perhaps impossible for this type of mowing apparatus to negotiate an embankment in a substantially vertical direction, or perpendicular to the elongated axis of an embankment because of safety or power limitations, or both.

Manually operated power mowers are those operated by a man on foot, whether or not the mower itself is self-propelled. This class of mower is capable of safely negotiating slopes somewhat more easily than tractor drawn apparatus. However, the limitation as to the percent of slope negotiable would still apply, although somewhat modified because of the nature of manually operated equipment versus tractor drawn equipment. Naturally, a manually operated power mower is not capable of servicing nearly as much area per a given period of time as is the tractor drawn apparatus.

Because of the limitations inherent in the classes of mowing apparatus discussed above, there are at present many natural or man made embankments on which the only method of safely removing grass or other vegetation would be to do so by hand, utilizing hand tools. This obviously would require an exorbitant number of man hours, when compared with the man tractor hours required to trim vegetation on any given area. Notwithstanding the fact that this type of work can be accomplished by unskilled labor, and at the lowest possible dollars per hour labor rate, it is nevertheless uneconomical and costly. In addition, a further cost inherent in the manual labor method is the requirement for additional supervisory personnel to maintain crew discipline and insure the timely completion of work schedules. Altogether, it is not usually economically feasible to operate large crews of laborers only for the purpose of maintaining steep embankment areas, which are not otherwise accessible by powered mowing equipment.

OBJECT OF THE INVENTION

It is therefore a primary object of the present invention to provide means for enabling conventional, powered mowing equipment to cut or trim natural vegetation on very steep embankments.

Another object of the invention is the provision of a unique tractor towable apparatus which includes means for both transporting a power mower, and for controlling the cutting excursions of the mower during operation by cable winch means.

A further object of the invention is to provide controls on an associated power mower for starting and stopping the engine, and for operating the steerable front wheels during a mowing operation, the controls being remotely controllable by radio transmitter means.

A still further object of the invention is the utilization of the combined mowing apparatus, including a tractor, a tractor towable apparatus, and a power mower, in a novel method of cutting or trimming vegetation on very steep embankments.

Yet another object of the invention is to provide for alternate methods of mowing steep embankments, depending on (1) whether or not the combined apparatus has an accessible service road above or below the embankment, and (2) whether or not the embankment itself is visible to a tractor operator, while operating the combined equipment from a service road above the embankment.

These and other objects and advantages of the details of construction of the invention will become apparent to those skilled in the art after reading the following description of one illustrative embodiment of the invention.

SUMMARY OF THE INVENTION

This invention relates to an apparatus for enabling power mower equipment to negotiate by remote control earth embankments of any degree of slope, to cut or trim grass, or other vegetation growing thereon. The apparatus comprises a bi-wheeled, skeletonized trailer, suitably configured for attachment to any class of farm type tractor normally utilized by highway field maintenance departments. A power take-off input mechanism is provided on the trailer for selective coupling and decoupling to the tractor, by conventional means. Power derived from the tractor is selectively transferable via a clutch mechanism (which is integral to the trailer) to the power train; the power train essentially comprises a winch-type cable reel, mounted parallel to and concentric with the power train shaft on the trailer frame. The cable reel is capable of bi-directional rotation, as responsive to the power take off and its manual controls, and is capable of being braked independently of the power take off source.

A tiltable platform, which comprises the upper portion of the trailer, is hingedly connected to the trailer. In a manner similar to that of a multiple automobile hauling carrier, the tiltable platform is configured to accommodate a self-powered wheeled mower for transporting purposes, and includes a pair of movable ramps for use in offloading the mower for use.

The self-powered mower has integral remotely controlled electrical starting, stopping, and steering means, which will be discussed in more detail later. In the present embodiment, the mower is essentially a conventional type self-powered rotary cutter, modified to the extent required to provide for the above remote control functions and for attachment to one end of a control cable, the other end of which is attached to and coiled on the aforementioned cable reel.

In order to better comprehend the novelty of the mowing method and the mowing apparatus, a preliminary operational embodiment is described herewith. The platform containing the mower is tilted and the mower is power lowered by cable from the platform to the ground by operating the power take-off means. The motor with its cutting blade is then started by transmitting (by radio means) a signal to the receiving and translating mechanism on the mower. As the mower is lowered down the embankment by a cable controlled gravity movement, a swath of vegetation the width of the mower is cut. At the bottom of the embankment, the steerable front wheels are operated to the right or the left by means of a second or third frequency channel radio transmission. The power take off drive to the cable reel is reversed and the mower is "winched" from the bottom to the top of the embankment, cutting a new and uncut swath of vegetation in its path. Again at the top of the embankment, the steering mechanism is remotely operated as before, the cable reel drive is reversed, and the mower descends down the embankment cutting a new swath.

The operation in this instance as described above is controlled entirely by the tractor operator, who has basically three major control functions: (1) operating the power take-off mechanism to raise and lower the mower, (2) operating the tractor mounted radio transmitter to start, stop and steer the mower, and (3) controlling the forward movement of the tractor itself, in coordination with the lateral displacement of the mower. At the termination of cutting operations, the mower is power-raised to the top of the platform, the platform tilted or returned to the horizontal by remotely controlled hydraulic means, the offloading ramps are raised to a substantially vertical portion, and the entire combined apparatus is prepared for movement to another work area, as required.

BRIEF DESCRIPTION OF THE FIGURES OF DRAWINGS

The present invention may more readily be described by reference to the accompanying drawings, in which:

FIG. 9a is an enlarged side elevational view of the cable trolley means shown in FIG. 9;

FIG. 9b is an end view of FIG. 9a;

Figure 10:
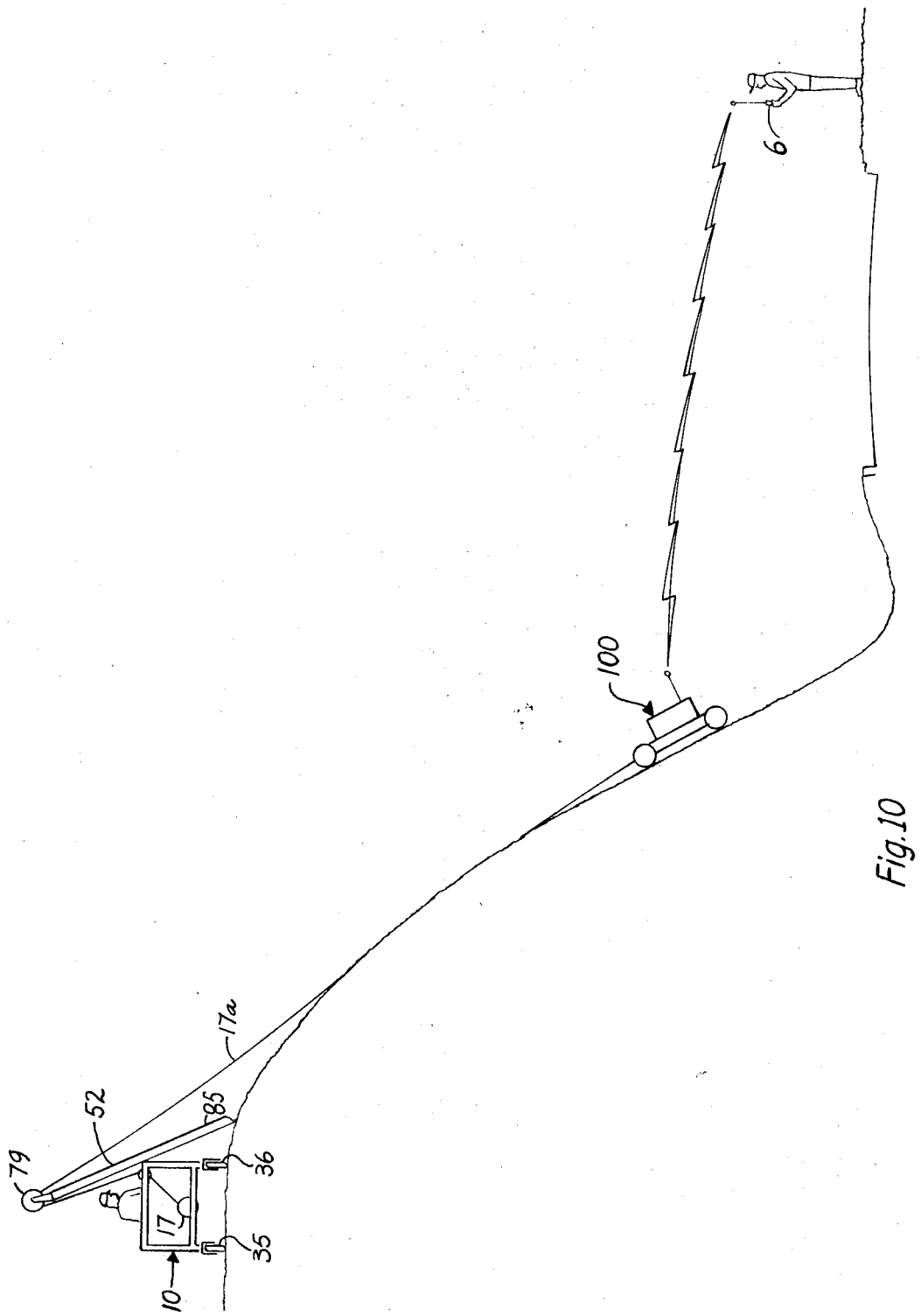

FIG. 10 is a schematic view of a second alternate method of cutting vegetation by the present invention, whereby the embankment to be mowed is not visible to the tractor operator, and a second off tractor operator is required to operate the demountable tractor-mounted radio transmitter for controlling the steering mechanism on the power mower; and, FIG. 11 is a block diagram showing the various mechanical and electrical controls to be operated in accordance with the present invention.

DESCRIPTION OF THE ILLUSTRATIVE EMBODIMENT

Figure 1:
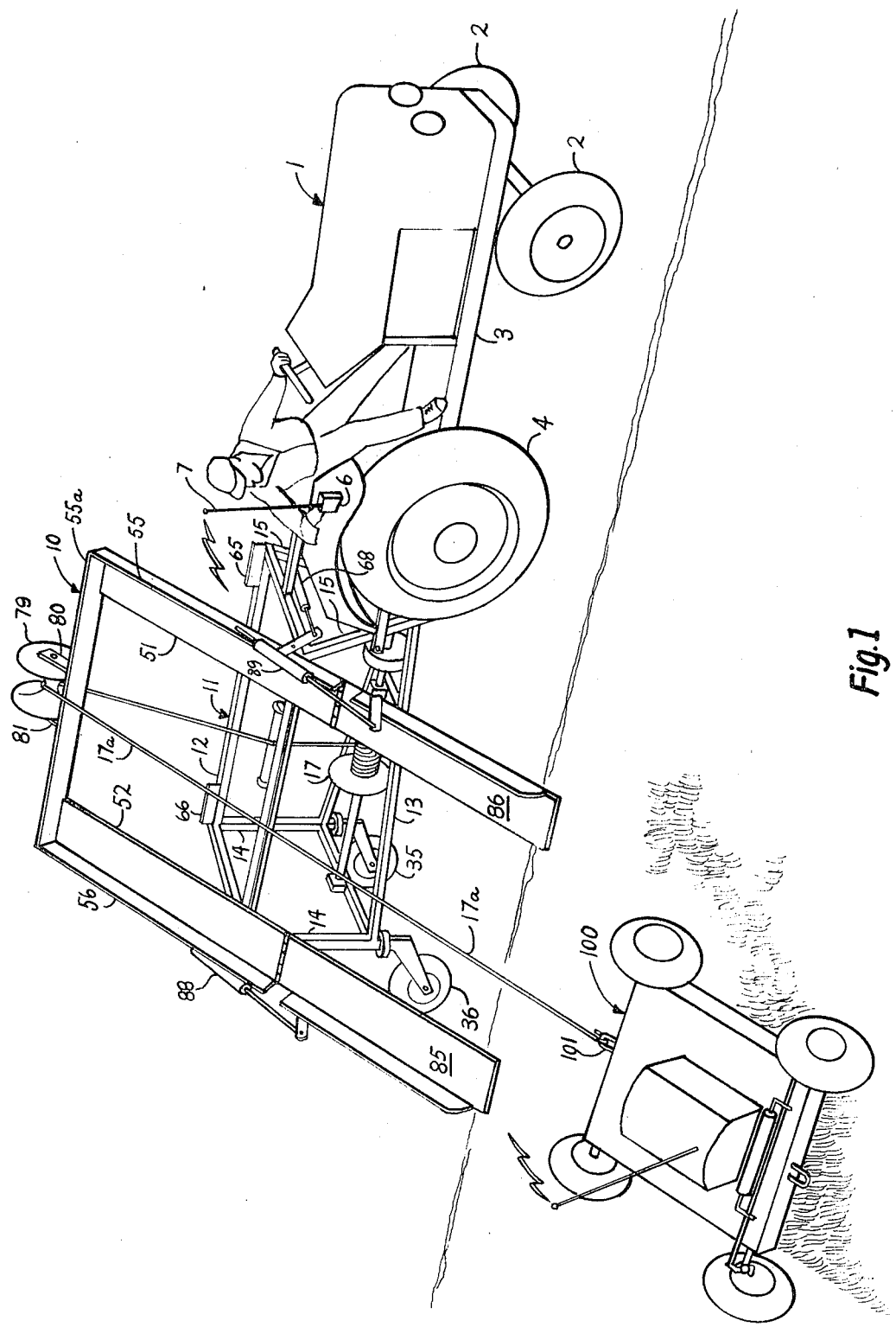
FIG. 1 is a perspective view of the combined mowing apparatus and towing tractor showing an operating embodiment, wherein the tractor and trailer are operated from a service road above the embankment to be mowed, and the power mower is lowered and raised directly by the tailer mounted winch means.

Referring now to the drawings, the same numerals indicate corresponding elements through the several views. As shown in FIG. 1, the tractor 1 is substantially a conventional, manually operated vehicle, comprising a pair of steerable front wheels 2, chassis 3, and a pair of driving wheels 4, which are substantially larger than the front wheels 2, as is normally the case on farm type tractors, or those of a similar type utilized by highway field maintenance departments. The only critical requirement is that the tractor, and its engine, be capable of sufficient motive and drawbar power to safely control the trailer 10. The rear portion of the chassis 3 incorporates a seat, 5, for supporting an operator. Easily accessible to the operator are various conventional controls for operating the tractor itself, as well as other unique mechanical and electrical controls incidental to the operation of the combined mowing apparatus.

A multiple-channel transmitter 6 normally mounted on the tractor, and suitably located for convenient access by the tractor operator. When mounted on the tractor, power for operating the transmitter is obtained from the tractor. Transmitter 6 provides a means of supplying a plurality of individual radio frequency signals, each suitable for remotely controlling a selected function of an associated power mower, to be described later. The transmitter 6 is demountable from tractor 1 for use in an alternate mowing method of the present invention, which will be described later. When demounted from tractor 1, transmitter 6 contains an integral and switchable rechargeable battery power supply. Antenna 7, which is mounted on transmitter 6, is provided for the purpose of radiating radio frequency signals to the mower-mounted receiver/translator mechanism.

Conventionally, tractors of the type described above have one or more power take-off and power controlling mechanisms for supplying motive power and control to a wide variety of towed apparatus. Generally, these apparatus are mechanical in nature, and may include both hydraulic and electrical control mechanisms. The present invention employs several such power and power control mechanisms, as will be described hereafter in connection with the railer apparatus embodiment.

The primary innovative embodiment of this invention is trailer 10, as shown generally in FIG. 1. Trailer 10 is especially configured to be towed behind tractor 1, but it will be obvious to those skilled in the art that it could be towed by any self-powered vehicle, which was otherwise designed to accommodate the towing connections of the instant trailer.

Trailer 10 will now be described with reference to FIGS. 1 through 4. In cooperation with tractor 1, trailer 10 provides means by which power mower 100 is enabled for operation by a single tractor operator in the performance of cutting vegetation on steep embankments. Trailer 10 comprises a skeletonized chassis 11 which may be constructed of any appropriate metal stock, in accordance with good engineering practice. It should be noted that the dimensions of chassis 11 are not critical and can be easily varied to accommodate the various mechanisms or assemblies which are subsequently mounted on the frame portions of the chassis. Chassis 11 generally is formed of upper frame 12 and lower frame 13, frames 12 and 13 being suitably joined with a plurality of rear struts 14 and forward struts 15. Rear struts 14 are substantially vertical, while forward struts 15 are angularly inclined to form two sides of a triangularly shaped frame. Forward struts 15 are joined and terminated at their lower extermities in flexible foot 16; the foot normally rests above and out of contact with the ground during towing operations, but may serve as a resting pad for the front of trailer 10 when the trailer is detached from the tractor. The upper frame 12 primarily forms the mounting base for a hinged, tiltable platform, on which a power mower is both transported on and offloaded from frame 12 as will be described later in connection with the tiltable platform.

Shaft 30, which is mounted horizontally across both forward struts 15, provides a mounting base for connections to be installed between tractor 1 and trailer 10. These connections, although not shown, may be of any conventional type which provides for both rigid, lateral connections, and independent vertical motion between trailer 10 and tractor 1. Connecting linkages are required at both shaft ends 30a and 30b, the opposite ends of the linkages being disconnectedly attached to the tractor 1.

Rear struts 14 are terminated at their base ends in removable, swivel type, U-shaped wheel mounting brackets 31 and 32. Mounted for free rotation in brackets 31 and 32 are wheels 33 and 34 respectively, on which are installed pneumatic tires 35 and 36. Tires 35 and 36 may be of the solid core or inflatable type, depending on the total load to be carried on trailer 10 and the type of terrain to be traversed.

Lower frame 13 forms a polygonal-shaped base, on which is mounted the various components of power train 22. Power train 22 primarily comprises a cable drum 17 for controlling by means of cable 17a the substantially vertical ascent and descent of the power mower. Cable drum 17 is mounted for rotation on shaft 18, and is keyed to the shaft. Brake mechanism 19 is suitably mounted on shaft 18, and provides a safety brake means for cable drum 17 in the event of failure of any of the components of the power take off mechanism. A portion of brake 19 is attached to strut 20 in a conventional manner. Brake mechanism 19 may be any friction-type braking device which can be suitably mounted for either automatic or remotely-controlled manual braking. In the present invention brake 19 is remotely controllable by the tractor operator through a suitable control linkage (see FIG. 11).

In a manner similar to brake 19, clutch 21 is remotely controllable by the tractor operator from his normal operating position on the tractor (see FIG. 11), and provides a manually selectable means of engaging and disengaging the drive means to cable drum 17. It can thus be seen that clutch mechanism 21 provides a means of selectively starting and stopping the bi-directional winch type rotation of cable drum 17. Clutch 21 may be of any suitable design, consistent with the configuration of lower frame 13.

Shaft 18 is mounted for rotation in bearing 23, extends through and is keyed to cable drum 17, is mounted in bearing 24, and is terminated in a first section of clutch 21. The said first section of clutch 21 is keyed for rotation with shaft 18 and is mounted in a selectively driving relationship with a second section of clutch 21. Shaft 22 is keyed to the said second section of clutch 21, is mounted for rotation in bearing 25, and is terminated in a first section of universal joint 26. The second section of universal joint 26 is mounted for rotation as a part of shaft 27. Shaft 27 is a portion of the rotational power take-off linkage between tractor 1 and trailer 10. The aforesaid power take-off connection is additionally shown schematically in FIG. 11.

Rotational drive from the tractor mounted power take-off mechanism is imparted to trailer 10 through shaft 27, universal joint 26, and a first section of clutch 21. As controlled by the tractor operator, the second section of clutch 21 is placed in a driving relationship with the first section, which in turn imparts bi-directional rotational drive through safety brake 19 to cable drum 17. Thus, cable 17a is wound up on or unwound from drum 17 as a result of drive from the aforesaid power take-off mechanism.

As previously stated, upper frame 12 primarily forms the mounting base for a hinged, tiltable platform, on which a power mower is both transported on and offloaded from.

Figure 2:
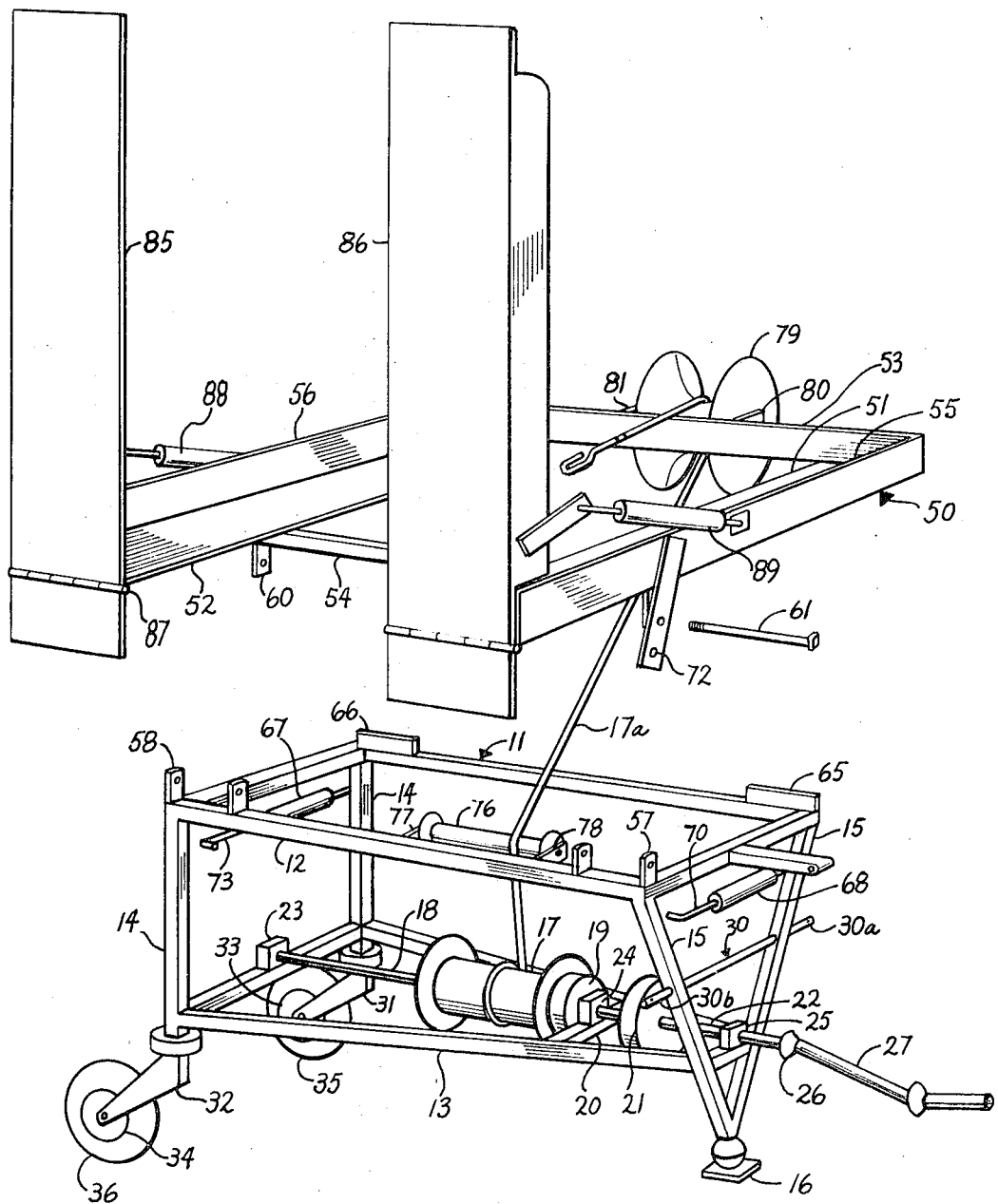
FIG. 2 is an exploded perspective view showing a portion of the tractor-towable trailer and its associated power train, with the remaining structure having been removed for clarity.
Figure 3:
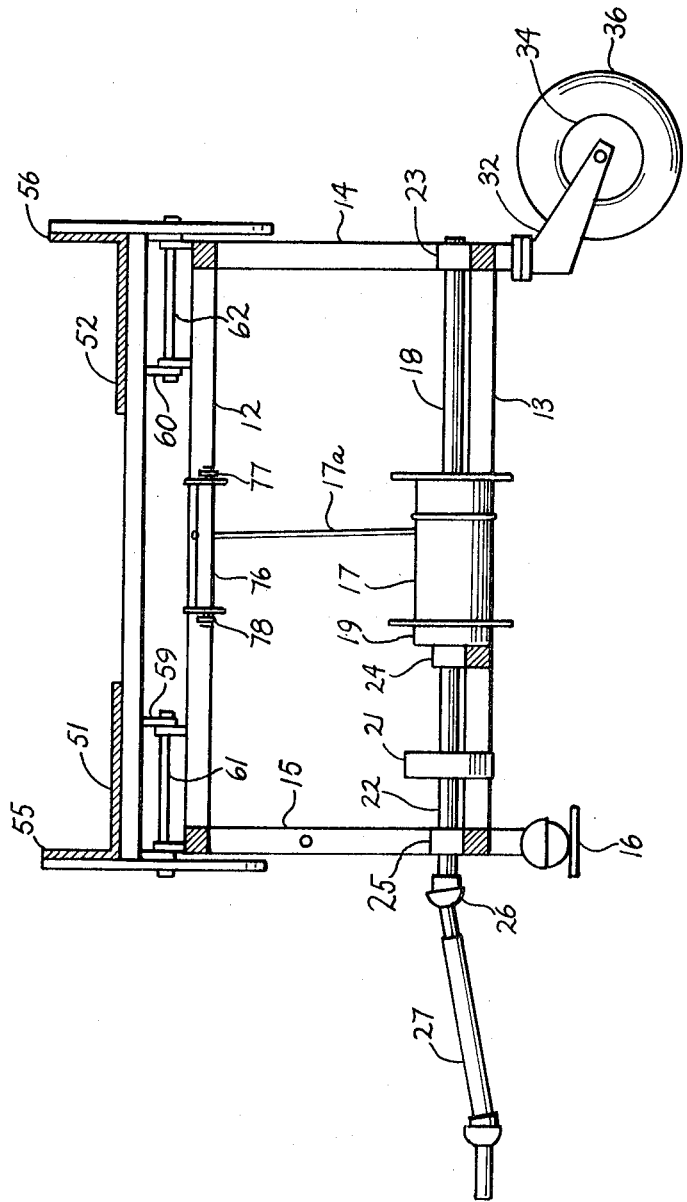
FIG. 3 is a vertical sectional view of the tractor-towable trailer taken substantially longitudinally through the center of the trailer and showing its component parts generally in block form for simplicity.

Referring now particularly to FIG. 2, the platform 50 consists primarily of two tracks 51 and 52, mounted in a parallel manner and spaced apart a distance suitable to accommodate the lateral wheel spacing of a selected power mower. It will be obvious to one skilled in the art that the lateral spacing of tracks 51 and 52 can be easily varied by design to accommodate any particular class of power mower. It would also be feasible to select a wider material for each of tracks 51 and 52 so that a greater variety of mower tracks widths could be accommodated. Tracks 51 and 52 are joined together at their ends in any suitable manner by crossbars 53 and 54. L-shaped wheel retaining ledges 55 and 56 are provided on the outside edges of tracks 51 and 52 respectively, for retaining and guiding the wheels of the mower during both transporting and loading operations. Although FIG. 2 is an exploded perspective view, it can be seen that in its non-tilted position, platform 50 rests on top of and substantially parallel to upper frame 12. U-shaped platform mounting brackets 57 and 58, which are securely mounted on upper frame 12, provide a tiltable mounting base for platform 50. Brackets 59 and 60 are mounted on the underside of tracks 51 and 52 respectively, and are configured to match mounting brackets 57 and 58. Platform 50 may be attached to (or subsequently detached from) upper frame 12 by inserting carriage bolts 61 and 62, along with other necessary mounting hardware. Mounting brackets 57 through 60 necessarily cause platform 50 to be slightly elevated above upper frame 12. To compensate for this height, and to permit the platform and frame to be mounted both level and parallel, wedges 65 and 66 are mounted on upper frame 12.

In reference to FIG. 2, it will be observed that a hydraulic platform lift is provided on the trailer, which is remotely controllable by the tractor operator from the tractor itself. Hydraulic cylinders 67 and 68 provide means for lifting (or lowering) platform 50. Cylinder 68 is pivotally mounted on slot 15, while piston shaft 70 is pivotally connectible with track 55 at point 71. In a like manner, cylinder 67 is pivotally mounted on slot 14, while piston shaft 72 is pivotally connectible with track 56.

As shown in FIG. 1, cable 17a which was discussed previously in connection with the operation of cable drum 17, is terminated in a detachable connector 101 on mower 100. As cable 17a is unwound from cable drum 17 on the way to connector 101, it necessarily follows a variably contoured path, which is never a straight line; therefore, guide rollers are required for guiding and changing direction of the cable. Guide roller 76, which is mounted for free rotation between brackets 77 and 78, is attached to upper frame 12, as shown in FIG. 2. As cable 17a leaves drum 17, it changes direction at, and is guided by guide roller 76. It should be noted at this point that the position of guide roller 76 will not change when platform 50 is raised or tilted to an offloading position. A second guide roller 79, which is mounted for free rotation between brackets 80 and 81, is attached to crossbar 53 on platform 50. Cable 17a is guided around roller 79 as shown in FIG. 2. It will now become evident, based on a previous discussion which related to the tilting of platform 50, that guide roller 79 will be raised and lowered during the setting up operation since it is attached to a portion of platform 50. Therefore, cable 17a will follow a changing path around rollers 76 and 79 during the elevation, or lowering, of platform 50.

Figures 5, 6, 7:
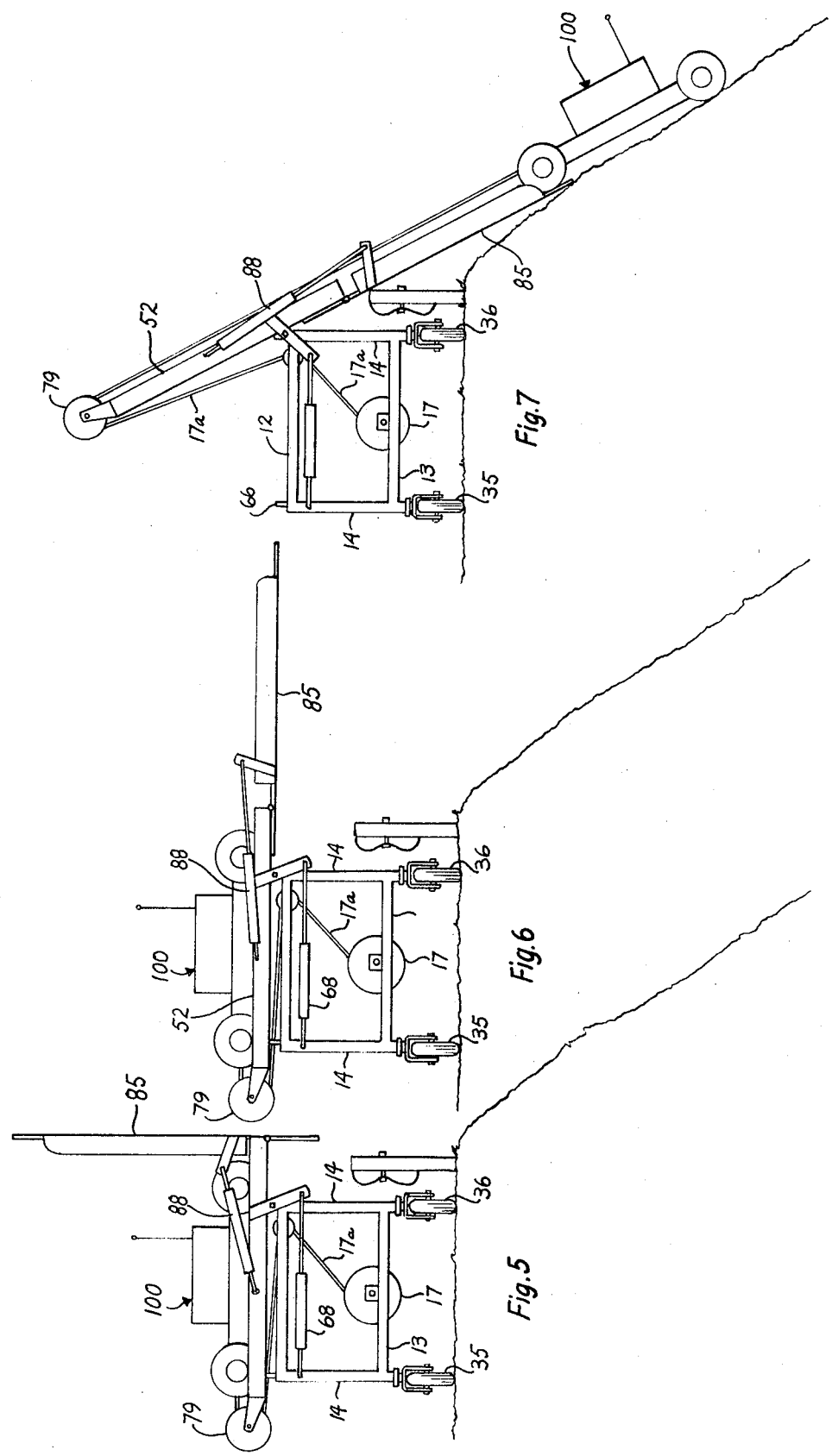
FIG. 5 is a partial end view of the tractor-towable trailer showing a pre-operational configuration, adjacent an embankment.
FIG. 6 is a partial end view of the tractor-towable trailer, similar to the view shown in FIG. 5, but with the adjustable loading ramps partially lowered.
FIG. 7 is a partial end view of the tractor-towable tailer, similar to the views shown in FIGS. 5 and 6, but with the hinged mower transporting ramp tilted to a mower-lowering position, and with the power mower lowered sufficiently to clear the ramp and in contact with the embankment.
Figure 8:
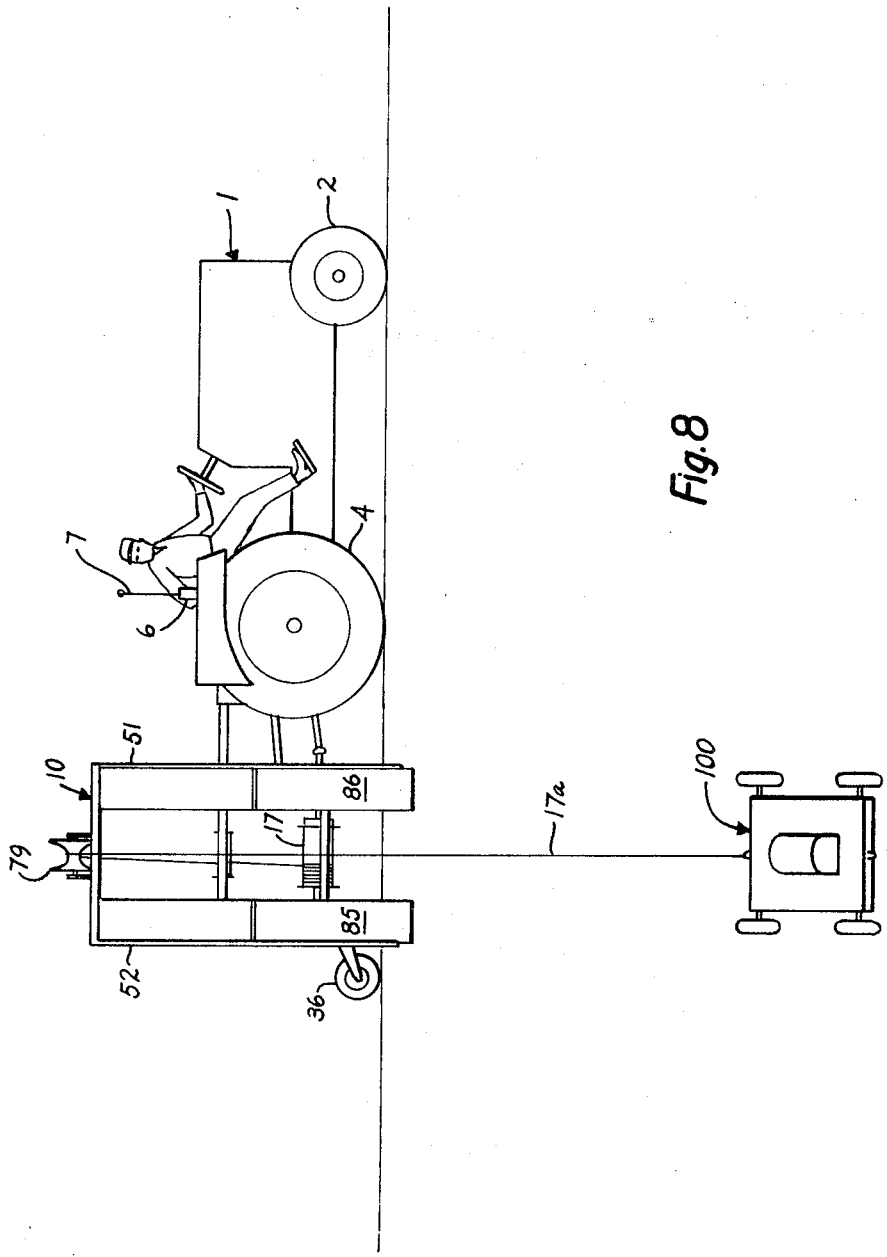
FIG. 8 is a side schematic view of FIG. 7 showing one method of cutting vegetation by the present invention, whereby the combined mowing apparatus is operated from a service road above the embankment and the power mower is lowered by cable in an operation condition to cut swath of vegetation.

The above may be seen more clearly by referring to FIGS. 5, 6, and 7. In FIG. 5 the trailer/mower combination is in the travel or non-operational position. Platform 50 is parallel with the upper frame 12; therefore, cable 17a first follows a path from cable drum 17 to and around guide roller 76. This path does not change at any time. From guide roller 76, cable 17a proceeds in a substantially horizontal path to and around guide roller 79 and thence to mower connection 101. It is noted at this point that in the configuration shown in FIG. 5, or the traveling position, that cable 17a tends to hold the front wheels of mower 100 secure against ledge stops 55a, thus insuring that the mower is secured while being moved from site to site.

By referring next to FIG. 6, it will be observed that although mower 100 is being prepared for offloading, platform 50 has not been tilted; therefore, the disposition of cable 17a is unchanged.

In FIG. 7 platform 50 has been tilted to an offloading position and mower 100 has been lowered to a ground engaging position. It may now be observed that cable 17a has assumed a new position; this is the normal working configuration of the combined mowing apparatus. From guide roller 76, cable 17a now proceeds in a substantially vertical direction, under and around guide roller 79, returning generally downward to power mower connection 101; this may also be seen of FIG. 1.

Returning particularly now to FIG. 4, in cooperation with FIGS. 1, 2, and 5–7, it will be observed that upon hydraulically raising platform 50, tracks 51 and 52 will not be in a ground engaging relationship, since they are not of sufficient length. Ramps 85 and 86 are provided to extend from the downhill ends of tracks 51 and 52 to the ground. The shape of each ramp 85 and 86 is essentially the same as that of tracks 52 and 51 respectively, L-shaped, in order to provide for a smooth offloading transition of the mower. As shown in FIG. 2, ramp 85 is pivotally mounted at pivot 87, and is shown in a vertical traveling position. A power control cylinder 88 is secured between ramp 85 and track 52 by conventional means (not shown). In a like manner a power control cylinder 89 is secured between ramp 86 and track 51. The power controlled cylinders 88, 89, are detailed in operation to effect movement of the ramps 85, 86 to a mower offloading position as shown in FIG. 1 and to return the ramps to a vertical position. The vertical position of ramps 85 and 86 while traveling additionally secures mower 100, and provides a positive block against the mower leaving the platform accidentally. The ramp mechanism, as described above and as shown in FIG. 1 and 2, employs separate ramps 85 and 86 to provide a mower-lowering means, and is but one of several possible embodiments. It is obvious that the above method requires the tractor operator to lower the ramps to engage the ground for offloading the mower 100. Further, since tractor 1 and trailer 10 will not remain static during mowing operations, but will be traversed along the service road, ramps 85 and 86 will necessarily have to be returned to the vertical transport position during the mowing operation, but after the mower has been lowered to the ground. Otherwise, the ramps would be dragged along the ground, and would be damaged.

We turn now to a consideration of mower 100 as a part of the present invention. This mower is essentially a conventional, although somewhat modified power mower, whereby the mower engine provides power for driving a rotary cutting blade 102a. While the basic mower may be selected from a wide variety of conventional type machines, it is necessary to limit the selection to those mowers which have sufficiently powerful engines, are capable of being modified for mounting and adapting remote controls, and which are adequately rugged in construction. The modified mower for use in the present invention should include the following characteristics, (1) radio received means mounted on the mower, including an appropriate power source for operation, (2) transducer apparatus which is selectively responsive to multi-frequency signals received by the receiver, and thus capable of directly operating controls on the mower, (3) steering means on the mower, also capable of being operated by the aforementioned transducer apparatus, (4) remote engine starting and stopping means on the mower, which are responsive to functional signals from the transducer apparatus, and (5) portable-type power source mounted on the mower for powering a starting and stopping mechanism and the transducer means.

Figure 4:
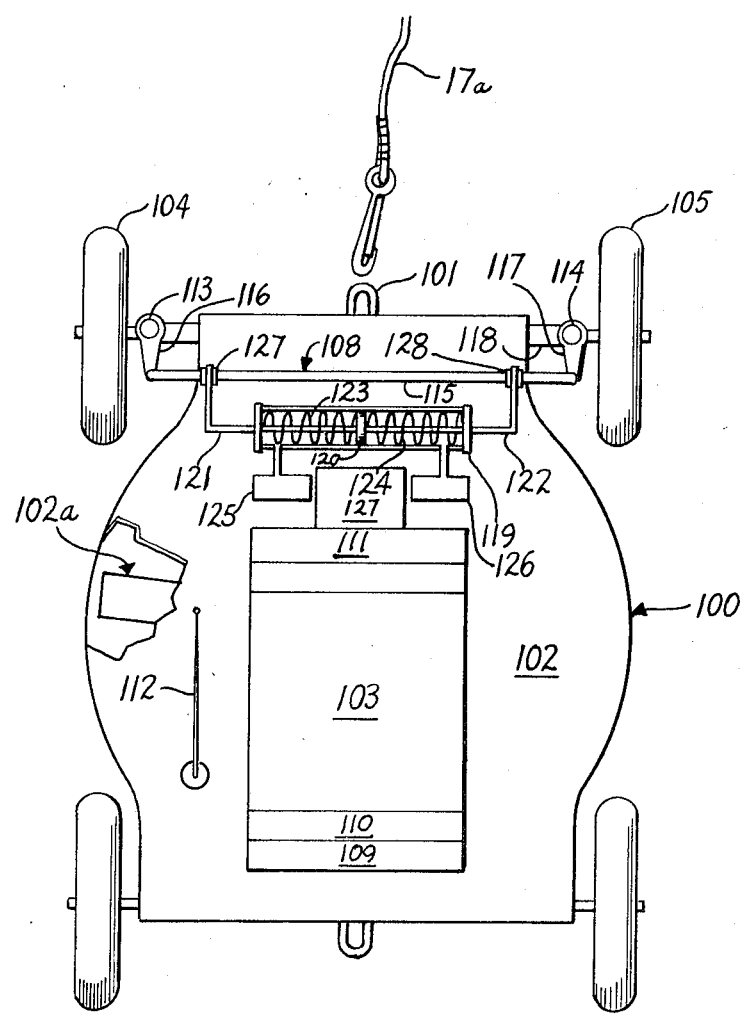
FIG. 4 is a top plan view of the power mower, showing particularly the remote controlled steering apparatus and the associated receiving and translating mechanism.

Referring now to FIG. 4 for a more detailed description of power mower 100. The mower basically comprises a body 102, cutting blade 102a, engine 103, steerable wheels 104 and 105, non-steerable wheels 106 and 107, steering apparatus 108, receiver 109, transducer 110, and power battery 111.

Engine 103 is substantially a conventional internal combustion engine of the type utilized on power mowers, with the exception that it has been modified to include conventional controls for starting and stopping the engine from a remote location. The engine 103 includes conventional starter and throttle means (not shown) capable of being controlled by remotely transmitted radio signals as will be described hereinbelow.

Radio receiver 109, which is mounted on power mower 100, is a conventional multiple channel device containing a rechargeable battery power supply. Antenna 112, mounted on the mower and operatively connected to radio receiver 109, receives electromagnetic signals which are emitted from transmitter 6. Both transmitter 6 and receiver 109 are designed to compliment each other on specific pre-set frequencies. FIG. 11 shows schematically the allocation of the required functional frequencies for specific control functions of power mower 100. Transmitter 6 and receiver 109 must both incorporate at least three separate frequency determining circuits as will be discussed later in the operation of the combined mowing apparatus.

Transducer 110, which is shown schematically in FIG. 4, may be any suitable, conventional type of device capable of receiving selective signals from receiver 109, and translating these signals into the necessary mechanical and/or electromechanical motion. More specifically, when actuated by receiver 109, transducer 110 is required to directly operate an electrical starter on engine 103, and conversely to shut down the engine when required. Transducer 110 must also be capable of providing the necessary control, as directed by receiver 109, to operate the power mower steering apparatus 108, as will be described hereafter.

Referring again to FIG. 4, steering apparatus 108 is adapted to provide remotely controllable turning capabilities for steerable wheels 104 and 105. Wheels 104 and 105 are mounted for limited bi-directional turning about pivots 113 and 114 respectively. Lateral link 115 connects wheels 104 and 105 for coordinated turning, through pivotable links 116 and 117. Lateral connecting axle 118, which extends through and is mounted on the power mower 100, provides a base mounting means for pivots 113 and 114. The external case of hydraulic cylinder 119 is suitably mounted on the mower chassis. Cylinder 119 contains internally a centrally located piston 120, to which are attached L-shaped push-rods 121, and 122. Push-rods 121 and 122 are subsequently attached to lateral link 115 at connections 127 and 128. Centralizer springs 123 and 124 are mounted inside the cylinder on either side of piston 120. Springs 123 and 124, which are identical in shape and compression rating, maintain the aforementioned turning linkages in a centralized condition in the absence of an actuation of the piston 120. Valves 125 and 126 are electrically actuated valves, capable of being independently actuated by transducer 110 for selectively connecting alternate sides of piston 120 with a conventional hydraulic power source 127. Suitable electrical connections are made between valves 126 and 126, and transduces 110.

In summary, steering apparatus 108 would be substantially operated as follows: Assuming that the remotely located tractor operator desired to turn steerable wheels 104 and 105 to the right, he would activate frequency channel 3, which is a right turn signal (please refer to FIG. 11). Transmitter 6 would as a result transmit this signal, which would be received by receiver 109 on the power mower 100, and automatically relayed to transducer 110. Transducer 110 would then automatically translate and "forward" the signal to electrically valve 126, which would then be operated hydraulically to dispose piston 120 to the left against the resistance of spring 123. Spring 123 would not offer resistance sufficient to prevent the movement of piston 120, but would, upon compression, store sufficient energy to restore piston 120 to a centralized position upon deactivation of the right turn "order" from transmitter 6. Inasmuch as push rods 121 and 122 are both connected to piston 120, movement of the piston in either direction will obviously cause simultaneous movement of the push rods. In this instance, piston 120 was moved to the left; therefore, push rods 121 and 122 are correspondingly moved to the left. Since push rods 121 and 122 are fixed to lateral link 115 at connections 127 and 128, link 115 will likewise be moved concurrently to the left, with a coordinated movement of pivotable links 116 and 117. As a result of the movement of links 116 and 117, wheels 104 and 105 will be turned to the right. Upon termination of the right turn radio signal from transmitter 6, valve 126 will be "turned off" and piston 120 will be restored to a centralized position by the compression of spring 123 and thus, wheels 104 and 105 will be restored to their original non-turned position. The foregoing description of steering apparatus 108 reflects but one embodiment of means to remotely operate steering apparatus 108 on power mower 100 during mowing operations; minor variations are possible without departing from the general characteristics of the present invention.

OPERATION, AND METHODS OF OPERATION

The apparatus of the present invention has now been described in sufficient detail to enable one skilled in the art to comprehend the various unique as well as conventional components thereof, and their relationship to each other. This invention comprises, in addition to the aforementioned apparatus, three methods of mowing steep embankments. Inasmuch as it has been the custom to narrate the operational details of an invention, the following discussion will attempt to combine both the operational aspect and the detailed method of each embodiment, especially since operation and method in the present invention are for all practical purposes synonoymous. The three methods by which the invention may be preactived are as follows

PRIMARY METHOD

As shown in FIG. 1, the primary method of mowing steep embankments visualizes that there will be an access or service road, as the case may be, immediately adjacent to the top of the embankment to be mowed, and running generally parallel to the elongated axis of the embankment. The availability of an access road above the embankment is a prime requisite for the primary method because, the tractor operator may in this case operate the entire combined apparatus without any additional assistance. Please refer now to FIGS. 5-8 and 12 in connection with the following detailed description.

The tractor operator, having previously checked the various components of the combined apparatus for serviceability and safety standards, proceeds to the mowing site along an upper access or service road and halts the equipment at the point where the mowing operation is to begin. Having lowered the unloading ramps, the operator activates control (D), FIG. 11), whereby platform 50 is raised to an angular position preparatory to lowering mower 100. At this time the power mower is being held on the ramp by cable 17a which has not yet been released. Control (A) (FIG. 11) is then activated, connecting the trailer power train to the tractor power take-off, via control (B) (clutch) and slowly rotating the cable drum 17 to lower the mower 100 to the ground. In using the mower with a tractor not equipped with a reversible power take-off, the operator would allow the winch to free wheel and control the rate of descent with brake 19. The operator then activates control (E) (FIG. 11) on transmitter 6, which transmits a signal to receiver 109, thence to transducer 110, and the starter on engine 103 on mower 100. Once the power take-off control (A) is activated during the mowing operation, except for reversing direction, it is left running continuously, while the control of the mower through cable drum 17 is accomplished by use of clutch control (B). Initially, the steerable wheels on the mower are not operated, thus they remain aligned with the non-steerable wheels and the path of the mower will be straight down the embankment, under control of the tractor operator. Once the engine has been started remotely, the mower is prepared for operation. The operator, by engaging the clutch, lowers the mower down the embankment at a safe rate of speed, and a first swath of vegetation is mowed. When the mower is allowed to come to a stop at the bottom of the embankment, it is then necessary to turn the front wheels by use of remote control (F) or (G) (see FIG. 11). This is accomplished by the operator activating the appropriate control (F) or (G), depending on which direction the steerable wheels are to be turned. These controls are adjacent to the operator and located on transmitter 6. The signals are transmitted via transmitter 6, transmitter antenna 7, to receiver antenna 112, to receiver 109, thence to transducer 110, steering apparatus 108, and thus the steerable wheels are hydraulically operated to turn the required amount. Substantially simultaneously, the operator reverses the power tank-off control (A), thus the cable drum 17, when clutch-operated will "wind up" cable 17a, and as a result the mower will be pulled up the embankment cutting a second swath of vegetation, slightly overlapping the first swath which was cut on the downhill operation. When the mower once again has been pulled to the top of the embankment, the previous operation is repeated; the power take-off drive is reversed allowing the cable to again "unwind" to lower the mower, the steerable wheels are again turned by the remote control means to provide for cutting a third swath of vegetation during the ensuring downhill traverse. It is obvious that at the appropriate time, the tractor operator must also move the tractor in a forward direction in coordination with the lateral advance of the power mower. In this method, the operator is able to see the entire site of the mowing operation, thus making it possible to obtain maximum safe operation, providing the combined mowing apparatus is operated otherwise in a safe manner. Brake control (C)(FIG. 11) is not utilized for normal operation, and is reserved as a safety brake means, in the event of failure of the power take-off mechanism and/or the clutch mechanism. In summary, the primary method of the present invention, as described above, is the most efficient and the least time consuming. Unfortunately, there is not a topside access or service road available for cutting all embankments which will be encountered. Therefore, two alternate methods are envisioned, and are described hereafter. The combined mowing apparatus to be employed in the two alternate methods is the same as that used in the primary method.

ALTERNATE METHOD NO. 1

Figure 9:
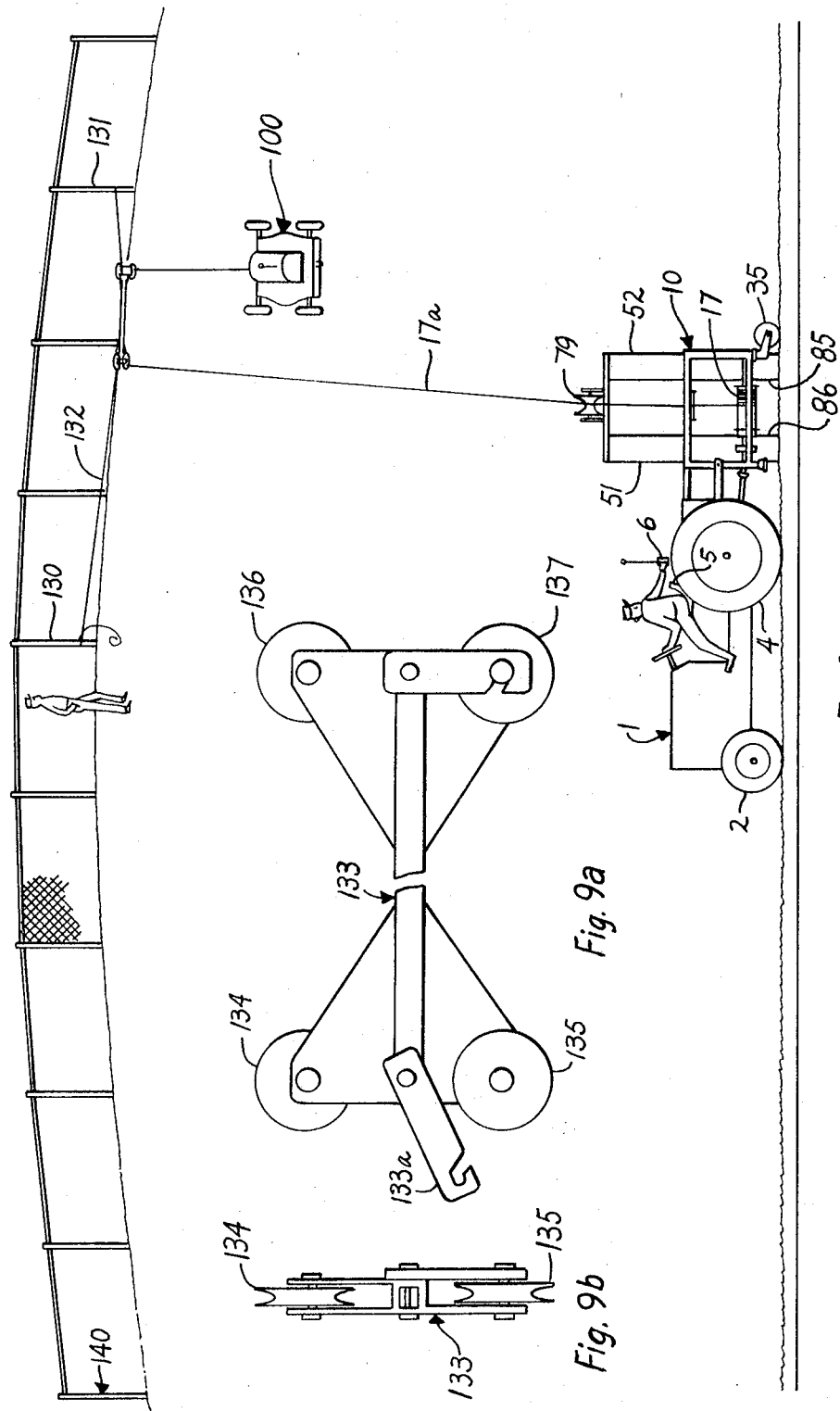
FIG. 9 is a schematic view of an alternate method of cutting vegetation by the present invention, whereby the combined mowing apparatus is operated from a service road below the embankment, and the power mower is cable controlled through laterally shiftable cable pulleys mounted on posts above the embankment.

Please refer now to FIGS. 9 and 12 in connection with the description of alternate method number 1 of mowing steep embankments, utilizing the combined mowing apparatus of the present invention. It will be observed from FIG. 9, that in this instance, there is not an access or service road available above the embankment, but there is one available below the embankment. It is noted that in FIG. 9 a series of posts are located above the embankment; these are the fence posts of the right-of-way fence usually found adjacent to a large percentage of modern highways, and nearly always on the Interstate systems highways. If there is neither a topside road or a fence, whereby the fence posts may be utilized as anchors for cable pulleys, it would be advisable to effect a one-time installation of posts at the top of those embankments for permanent use in the alternate method No. 1 when utilizing the mowing apparatus of the present invention. In this method a second operator is usually required, the first operates the combined mowing apparatus essentially in the usual manner, and the second operator supervises the attachment and detachment of cable pulleys to a series of posts at the top of the embankment. This method allows the power mower to be operated essentially the same as in the primary method once a series of pulleys are hooked up for the operation. Please note that in FIGS. 9 and 9a, posts 130 and 131 are the outside posts of a four-post cluster. Attached to posts 130 and 131 is a length of cable 132 which is attached with quick attachable devices with sufficient slack in the cable to provide for the operation. Attached to cable 132 is an assembly consisting of a rigid bar 133, on which are mounted four pulleys 134 through 137, as shown in FIG. 9a. Pulleys 134 and 136 are in rolling engagement with cable 132 and are able to freely traverse the entire length of cable 132 between posts 130 and 131. Pulleys 135 and 137, also firmly attached to rigid bar 133, provide rolling engagement with cable 17a, which is the mower cable that operates between cable drum 17 and mower connector 101. It will now be obvious to one skilled in the art that once the rigid bar pulley apparatus 133 is hooked up by the second operator who is at the top of the embankment, the mowing operation may proceed. The operation of all mower controls are the same as before, except that before mowing can commence the second operator must detach cable 17a from the mower, which is initially located at the bottom of the embankment, having been offloaded from the trailer. The operator must pull the cable to the top of the embankment, thread the cable through pulleys 135 and 137 (FIG. 9a), and return the end of the cable to be hooked to the mower at the bottom of the embankment. Obviously the tractor operator must release any controls on cable drum 17 so that the second operator can freely pull the cable from the drum. Once the operator rehooks the cable to mower connector 101, the mowing operation may begin. The second operator now returns to the top of the embankment where he will assist in the mowing operation. As shown in FIG. 9, the mowing operation may proceed as in the primary method, until the slidable rigid bar 133 and particularly pulley 134 comes adjacent post 130. This will occur because as the mower traverses the slope laterally the rigid bar 133 will be virtue of its four pulleys also move laterally in coordination with the movement of the mower. At this point, it will be necessary for the tractor operator to stop the mower when it is at the bottom of the embankment, inasmuch as the second operator will now have to detach cable 132 from its connections on fence posts 130 and 131, and move the entire bar-pulley assembly to the left (as viewed in FIG. 9). Thus, the reason for placing the mower at the bottom of the embankment has become obvious; the additional weight of the mower would make it impossible for the second operator to move the cable-pulley assembly. Cable 132 can now be reconnected between posts 130 and 140 by the second operator and, when completed the tractor operator recommences the mowing operation as before. As in the primary method, the tractor operator periodically moves the tractor in the direction of mowing in order to maintain essentially a perpendicular relationship between cable 17a, the elongated axis of the embankment, and the mowing apparatus. The key to the efficiency of this alternate method is in the amount of time required by the second operator to move the cable-pulley assembly from two fence posts to two other fence posts. Therefore, in preparing for this method of operation, it would be significantly advantageous to employ the maximum of quick attachable connectors in the rigging of the cable-pulley assembly. With the adoption of quick attachable connectors, and with optimum teamwork between the two operators, the amount of mower downtime can be kept to a minimum. Although the alternate method No. 1 is not as efficient as the primary method, it is economically feasible and far superior to other less efficient methods of mowing vegetation under similar circumstances. In the alternate method No. 2 we again return to the situation where the combined mowing apparatus can be operated from the topside of an embankment; however, one major difference exists.

ALTERNATE METHOD NO. 2

Please refer to FIGS. 10 and 11 in connection with the following description of the alternate method No. 2 of mowing vegetation on steep embankments. In FIG. 10 it will be noticed that the combined mowing apparatus is being operated from a topside access or service road, as in the primary method; however, the configuration of the embankment is such that the majority of the downhill portion of the embankment is not visible to the tractor operator. As such, the operator would not be able to control the power mower during the time it was out of sight. This problem is overcome by again resorting to the use of a second operator, who removes transmitter 6 from its nowmal position on the tractor, and moves to a downhill position with the transmitter, where he can observe both the tractor operator, the power mower, and the entire embankment being mowed. As shown in FIG. 10, the second operator, now provided with transmitter 6, is positioned on the side of the roadway opposite the embankment being mowed, and from this vantage point in coordinated actions with the tractor operator he will at the appropriate time transmit signals to the mower-mounted receiver for the control of the steerable wheels. The second operator will also have to advise the tractor operator, probably with arm and hand signals, on the proper time to stop and start the cable drive to the mower. Thus, this method is practiced as follows: With the combined mowing apparatus in position atop the embankment, and the second operator positioned as shown in FIG. 10, the mowing operation is begun in the same manner as in the primary method. As the mower descends downhill there will be a point below which the mower will be out of sight of the tractor operator, even though he continues to operate the power take-off mechanism, which of course, continues to control the descent of the mower. At this time the second operator will have the mower fully in view and will be in visual communication with the tractor operator. When the mower has reached the bottom of the embankment, the second operator will signal the tractor operator to stop the mower and to reverse the direction of the cable drum drive. Substantially simultaneously, the second operator will operate the necessary control on transmitter 6 to cause the steerable wheels on the power mower to be turned the proper amount. He will again signal the tractor operator to initiate the uphill ascent of the mower. At the time the mower reaches the crest of the embankment it will be in visual communication with both operators; however, since the second operator has the transmitter in his possession, he will still initiate the signal to the mower to operate the steerable wheels in preparation for the ensuing downhill descent of the mower. In this manner the two operators will control the combined mowing apparatus essentially in the same manner as in the primary method, with the exception that it will require them both to coordinate their actions to control the excursions of the power mower. It would be obvious that in lieu of arm and hand signals the two operators could utilize conventional "walkie-talkie" type radios for communicating purposes.

Various changes and modifications in the apparatus and methods chosen for purposes of illustration in the drawings will readily occur to persons skilled in the art having regard for the disclosure thereof, without departing from the spirit of the invention which is to be limited only by the scope of the appended claims.

What is claimed is:

1. A mowing apparatus for use in supporting and controlling grass cutting means adapted to cut grass on steep embankments, said mowing apparatus comprising; a supporting frame means, said supporting frame means including connectible elements for connecting said apparatus to translatable vehicle means, said supporting frame means including a movable mounted platform detailed for supporting said cutting means during a non-cutting transport operation, adjustable ramp means operatively connected to said platform for providing an on and off loading means for removing said cutting means from said platform, means operatively associated with said support platform and said frame means for effecting movement of said support platform between a first transport position and a second adjusted on and off loading position, means operatively associated with said platform support means and said ramp means for effecting movement of said ramp means between a first transport position and a second on and off loading position, a power operable winch means supported on said apparatus, said power operable winch means including a flexible cable means and including connectible means for connecting said winch means to a power source on said translatable vehicle means, cable guide means provided on said platform and said apparatus for guiding said flexible cable means during operation of said winch means and during adjusting movement of said platform means and said ramp means, and wherein said mowing apparatus includes a grass cutting means, said grass cutting means includes a cutting element operable for cutting grass in response to movement of said grass cutting means over a predetermined area, said grass cutting means including wheel means for supporting said cutting means during translating movement of said cutting means over said predetermined area and for supporting and guiding said cutting means during an on and off loading operation of said cutting means relative to said mowing apparatus, said flexible cable means being operatively connected to said cutting means for effecting movement of said cutting means in said on and off loading operation and for effecting movement of said cutting means over the predetermined area of a steep embankment for cutting grass.

2. A method of mowing grass on steep embankments, including the steps of:

a. connecting grass cutting means to one end of a flexible cable means with an opposite end of said cable operatively connected to a power operable winch means supported on a mobile control station located adjacent the base of an embankment on which grass is to be cut;

b. supporting an intermediate portion of said flexible cable means by a movable dolly means;

c. supporting said movable dolly means on anchor means located adjacent the top of said embankment, with said dolly being capable of translating movement relative to the top of said embankment;

d. raising said grass cutting means up said embankment in the direction of said dolly means by said winch means;

e. advancing said mobile control station with said winch means and advancing said dolly support means along a path in a direction substantially perpendicular to said first direction of movement;

f. lowering said grass cutting means down said embankment by gravity along a second laterally spaced path substantially parallel to said first path and in a second opposite direction while controlling said gravitational movement by said winch means;

g. again advancing said mobile control station with said winch means and advancing said dolly support means along a path in a direction substantially perpendicular to said first direction of movement; and h. repeating said raising in said first direction, said advancing in said substantially perpendicular direction, said lowering in said second direction and again said advancing in said substantially perpendicular direction until a desired area of said embankment has been cut.

* * * * *